United States Patent
Owens

(10) Patent No.: US 9,574,492 B2
(45) Date of Patent: *Feb. 21, 2017

(54) PORTABLE HYDROGEN SUPPLEMENTAL SYSTEM AND METHOD FOR LOWERING PARTICULATE MATTER AND OTHER EMISSIONS IN DIESEL ENGINES AT IDLE

(71) Applicant: HNO GreenFuels, Inc., Temecula, CA (US)

(72) Inventor: Donald W. Owens, Temecula, CA (US)

(73) Assignee: HNO Green Fuels, Inc., Temecula, CA (US)

(*) Notice: Subject to any disclaimer, the term of this patent is extended or adjusted under 35 U.S.C. 154(b) by 32 days.

This patent is subject to a terminal disclaimer.

(21) Appl. No.: 14/303,184

(22) Filed: Jun. 12, 2014

(65) Prior Publication Data
US 2014/0290595 A1    Oct. 2, 2014

Related U.S. Application Data

(63) Continuation-in-part of application No. 13/922,351, filed on Jun. 20, 2013, which is a continuation-in-part
(Continued)

(51) Int. Cl.
*F02B 43/08* (2006.01)
*F02B 43/10* (2006.01)
(Continued)

(52) U.S. Cl.
CPC ............... *F02B 43/10* (2013.01); *C25B 1/04* (2013.01); *C25B 15/02* (2013.01); *C25B 15/08* (2013.01);
(Continued)

(58) Field of Classification Search
CPC ............ F02B 43/10; C25B 1/04; C25B 15/02; C25B 15/08; F02M 25/12
(Continued)

(56) References Cited

U.S. PATENT DOCUMENTS 3,252,455 A    5/1966    Marshall
3,433,729 A    3/1969    Mikhailovich
(Continued)

FOREIGN PATENT DOCUMENTS

DE    19504142 A1    8/1995
JP    09-195076    7/1997
(Continued)

OTHER PUBLICATIONS

Russell et al. "Hydrogen Generation by Solid Polymer Electrolyte Water Water Electrolysis," American Chemical Society, Chicago Symposium, 1973, pp. 24-40.
(Continued)

*Primary Examiner* — Lindsay Low
*Assistant Examiner* — Charles Brauch
(74) *Attorney, Agent, or Firm* — Wagenknecht IP Law Group PC

(57) ABSTRACT

A portable on-demand hydrogen supplemental system is provided for producing hydrogen gas and injecting the hydrogen gas into the air intake of internal combustion engines for the purpose of increasing the combustion efficiency in the combustion chamber and lowering particulate emissions at idle. Hydrogen increases the laminar flame speed of diesel fuels, thus increasing combustion efficiency. Hydrogen and oxygen is produced by an electrolyzer from nonelectrolyte water in a nonelectrolyte water tank. The hydrogen gas is passed through a hydrogen gas collector. Nonelectrolyte water mixed with the hydrogen gas in the hydrogen gas collector is passed back thru the tank for distribution and water preservation. The system utilizes an an onboard diagnostic (OBD) interface in communication with the vehicle's OBD terminal, to regulate power to the system so that hydrogen production for the engine is
(Continued)

adjusted based on the RPM level and operation conditions of the vehicle.

5 Claims, 11 Drawing Sheets

Related U.S. Application Data of application No. 13/842,102, filed on Mar. 15, 2013, now abandoned, which is a continuation-in-part of application No. 13/224,338, filed on Sep. 2, 2011, now Pat. No. 8,449,754, which is a continuation-in-part of application No. 12/790,398, filed on May 28, 2010, now Pat. No. 8,499,722.

(60) Provisional application No. 61/313,919, filed on Mar. 15, 2010.

(51) Int. Cl.
  *C25B 15/02* (2006.01)
  *C25B 15/08* (2006.01)
  *C25B 1/04* (2006.01)
  *F02M 25/12* (2006.01)

(52) U.S. Cl.
  CPC ......... *F02M 25/12* (2013.01); *F02B 2043/106* (2013.01); *Y02E 60/366* (2013.01); *Y02T 10/121* (2013.01); *Y02T 10/32* (2013.01); *Y02T 90/42* (2013.01)

(58) Field of Classification Search
  USPC .......................................................... 123/3
  See application file for complete search history.

(56) References Cited

U.S. PATENT DOCUMENTS

| | | | |
|---|---|---|---|
| 4,025,405 A | 5/1977 | Dotson et al. | |
| 4,031,865 A | 6/1977 | Dufour | |
| 4,271,793 A | 6/1981 | Valdespino | |
| 4,368,696 A | 1/1983 | Reinhardt | |
| 5,272,871 A | 12/1993 | Oshima | |
| 5,711,865 A | 1/1998 | Caesar | |
| 5,810,977 A * | 9/1998 | Annecharico | B01D 1/0017 122/130 |
| 5,964,089 A | 10/1999 | Murphy et al. | |
| 6,033,549 A | 3/2000 | Peinecke et al. | |
| 6,257,175 B1 | 7/2001 | Mosher et al. | |
| 6,688,120 B2 | 2/2004 | Aoki et al. | |
| 7,021,249 B1 | 4/2006 | Christison | |
| 7,143,722 B2 | 12/2006 | Ross | |
| 7,458,368 B1 | 12/2008 | Huffman | |
| 7,552,702 B2 | 6/2009 | Stone | |
| 7,981,556 B2 | 7/2011 | Shiroma et al. | |
| 8,449,733 B2 | 5/2013 | Owens | |
| 8,449,734 B2 | 5/2013 | Owens | |
| 8,449,735 B2 | 5/2013 | Owens | |
| 8,449,736 B2 | 5/2013 | Owens | |
| 8,449,754 B2 | 5/2013 | Owens | |
| 8,454,808 B2 | 6/2013 | Owens | |
| 8,499,722 B2 | 8/2013 | Owens | |
| 9,399,946 B2 | 7/2016 | Owens | |
| 2004/0013918 A1 | 1/2004 | Merida-Donis | |
| 2004/0025807 A1* | 2/2004 | Jhetham | C25B 1/04 123/3 |
| 2004/0025808 A1 | 2/2004 | Cheng | |
| 2004/0203166 A1 | 10/2004 | Sullivan | |
| 2005/0229872 A1 | 10/2005 | Lange | |
| 2005/0279761 A1 | 12/2005 | Weiler et al. | |
| 2006/0051638 A1 | 3/2006 | Gross | |
| 2006/0260562 A1* | 11/2006 | Otterstrom | F02B 47/02 123/3 |
| 2007/0151865 A1 | 7/2007 | Shimko et al. | |
| 2007/0205111 A1 | 9/2007 | Bayliss | |
| 2007/0209608 A1 | 9/2007 | Rutledge | |
| 2007/0259220 A1 | 11/2007 | Redmond | |
| 2008/0257751 A1 | 10/2008 | Smola et al. | |
| 2009/0188240 A1 | 7/2009 | Suzuki et al. | |
| 2009/0283402 A1 | 11/2009 | Osman | |
| 2009/0320807 A1 | 12/2009 | Cerny et al. | |
| 2010/0012090 A1 | 1/2010 | Lewis, III | |
| 2010/0031977 A1 | 2/2010 | Sales | |
| 2010/0183931 A1 | 7/2010 | Hedman | |
| 2010/0236921 A1 | 9/2010 | Yang | |
| 2010/0275858 A1 | 11/2010 | Jeffs et al. | |
| 2011/0048961 A1 | 3/2011 | Smedley | |
| 2011/0185990 A1 | 8/2011 | Inwald | |
| 2012/0055422 A1 | 3/2012 | Owens | |
| 2012/0073522 A1 | 3/2012 | Owens | |
| 2012/0073523 A1 | 3/2012 | Owens | |
| 2012/0073524 A1 | 3/2012 | Owens | |
| 2012/0073525 A1 | 3/2012 | Owens | |
| 2013/0037003 A1 | 2/2013 | Sheerin | |
| 2013/0276726 A1 | 10/2013 | Owens | |

FOREIGN PATENT DOCUMENTS

| | | |
|---|---|---|
| WO | 2009-018814 A2 | 2/2009 |
| WO | 2010-084358 A2 | 7/2010 |
| WO | 2011-150322 A1 | 12/2011 |

OTHER PUBLICATIONS

Kim et al. "Hydrogen Production from Water Using Polymer Electrolyte Membrane," American Institute of Chemical Engineers, Nov. 7, 2004.

Papagiannakis, Ioannis. "Studying and Improving the Efficiency of Water Electrolysis Using a Proton Exchange Membrane Electrolyser," Thesis submitted to Strathclyde University, 2005.

PCT/US2011/038315 International Search Report mailed Jul. 13, 2011.

PCT/US2014/031017 International Search Report mailed Aug. 18, 2014.

\* cited by examiner

PORTABLE HYDROGEN SUPPLEMENTAL SYSTEM AND METHOD FOR LOWERING PARTICULATE MATTER AND OTHER EMISSIONS IN DIESEL ENGINES AT IDLE

CROSS-REFERENCES

This is a continuation-in-part application of application Ser. No. 13/922,351 entitled "HYDROGEN SUPPLEMENTAL SYSTEM FOR ON-DEMAND HYDROGEN GENERATION FOR INTERNAL COMBUSTION ENGINES" by Donald Owens, the contents of which are incorporated herein by reference.

BACKGROUND OF THE INVENTION

1. Field of the Invention

The present invention relates to hydrogen generation devices. More particularly, to a hydrogen supplemental system and a method for increasing combustion efficiency in the combustion chamber of diesel or other internal combustion engines and lowering particulate matter and other emissions at idle.

2. Description of the Related Art

A diesel engine is an internal combustion engine that uses the heat of compression to initiate ignition and burn the fuel that has been injected into the combustion chamber of the engine. The diesel engine has a higher thermal efficiency of any standard internal or external combustion engine due to its high compression ratio. Low-speed diesel engines as used in ships and other applications where overall engine weight is unimportant may have a thermal efficiency that exceeds approximately 50%. When in an idle state, a vehicle's main propulsion engine continues to operate while the vehicle is stopped. Idling is common in traffic conditions, especially during urban driving, such as at traffic lights or in stop-and-go driving during traffic congestion. However, idling periods in traffic are relatively short. There is more concern over long periods of idling of heavy-duty diesel engines while the vehicle is parked and not in active state. These long periods of idling have an adverse environmental impact and are a source of significant pollution and often unnecessary fuel consumption.

The idling periods in traffic, cause vehicles to emit significant amounts of pollution including, for example, nitrogen oxides (NOx) and volatile organic compounds (VOCs) which contribute to the formation of ozone smog; poisonous carbon monoxide; and particulate matter (PM) which contributes to asthma, heart disease, lung damage, and cancer. Recently, an effort has been made to reduce the amount of time that engines spend idling mainly due to fuel economy and emissions concerns, although some engines can also be damaged if kept idling for extended periods.

A major source of idle emissions are long-haul trucks, which are routinely idled overnight, mainly to provide cab heating and air conditioning. In addition to heat and air conditioning, truck accessories such as stereos, short distance radio communication systems such as citizen band radios (CBs), interior lights, televisions, computers and refrigerators demand power and can motivate idling even if climate control via the heating and air conditioning is unnecessary. In extreme cases, up to 6 kW of peak electrical power demand may be needed if multiple accessories are used at once.

Another significant source of diesel idle emissions can be railway locomotives. Unlike trucks, most locomotive engines do not use anti-freeze in their cooling systems. Thus, locomotives must idle their engines when the temperature drops below about 4° C. (40° F.) to prevent freezing of engine cooling water, thickening of engine oil and fuel and to maintain battery charge. At temperatures above 4° C., locomotives may idle to maintain a readily available engine, and/or to maintain comfortable temperatures inside the operator cab.

In yet another example, motor coach buses are another vehicle category that can experience long periods of idling of their main propulsion engine. This is primarily to maintain a comfortable interior compartment for passengers (heat or air conditioning). While not as numerous as trucks, coaches have attracted attention because, due to their large interior compartment, maintaining a comfortable interior temperature requires substantially more idling time than the typical long-haul truck or personal passenger vehicle.

Diesel engines and gasoline engines run more efficiently when they are operated under-load and at appropriate operating temperatures. They are highly inefficient at idle. A diesel engine at idle creates a disproportionately larger amount of harmful emissions, including CO, Nox and PM, and waste a greater amount of fuel than operation at load. The particulates also been reported to be much smaller (20 nm) than those at load (60 nm).

Although there is an understanding that hydrogen could be a substitute for gasoline in internal combustion engines, the conventional systems implementing the use of hydrogen typically produces the hydrogen and oxygen in a combined gas stream. The hydrogen and oxygen in the combined hydrogen and oxygen gas stream are not separated from each other and are known as HHO or Brown's gas. The use of HHO or Brown's gas in the case of modern gasoline powered vehicles is problematic for several reasons including interference with modern anti-pollution apparatus. Specifically the extra oxygen in the combined hydrogen and oxygen gas stream is detected by the vehicle's oxygen sensor which communicates this extra oxygen level to an on-board computer, namely and Electronic Control Unit (ECU) of the vehicle. The ECU then makes adjustments based on this detection including increasing the amount of gasoline being injected, thereby defeating any supposed fuel savings.

Diesel exhaust is composed of two phases gas and particles and both phases contribute to a significant health risk in human beings. The gas phase is composed of many of the urban hazardous air pollutants, such as acetaldehyde, acrolein, benzene, 1,3-butadiene, formaldehyde and polycyclic aromatic hydrocarbons. The particle phase also has many different types of particles that can be classified by size or composition. The size of diesel particulates that are of greatest health concern are those that are in the categories of fine, and ultrafine particles. The composition of these fine and ultrafine particles may be composed of elemental carbon with adsorbed compounds such as organic compounds, sulfate, nitrate, metals and other trace elements. Although the majority of the emissions from diesel engines are in the combustion process itself, most of the particulate emissions are the result of incomplete combustion. This is because all of the fuel injected into the combustion chamber is not burned. As a result unburned particulates and other emissions are inherent in diesel engines. Diesel exhaust is emitted from a broad range of diesel engines; the on-road diesel engines of trucks, buses and cars and the off-road diesel engines that include locomotives, marine vessels and heavy duty equipment.

The current technology to reduce particulate matter is either particulate exhaust filters or exhaust systems that attempt to burn the particulate matter once it reaches the exhaust. The use of exhaust filters require active monitoring to determine whether the exhaust filters have reached their maximum capacity. Further, the exhaust systems that burn the particulate matter are typically complex and expensive system.

SUMMARY OF THE INVENTION

The present invention relates to a portable and compact, on-demand hydrogen supplemental system and a method for producing hydrogen gas and monitoring and controlling the amount of hydrogen being produced and injected into the air intake of internal combustion engines, particularly for diesel engines for the purpose of causing a more complete combustion of the fuel in the combustion chamber. The system and method reduces fuel consumption and emissions of diesel or other internal combustion engines at idle and at operating conditions. Hydrogen and oxygen is produced by an electrolyzer at low temperatures and pressure from nonelectrolyte water in a nonelectrolyte water tank. The hydrogen gas is passed through a hydrogen gas collector. Nonelectrolyte water mixed with the hydrogen gas in the hydrogen gas collector is passed back thru the nonelectrolyte water tank for distribution and water preservation. The hydrogen gas and the oxygen gas travel in separate directions, therefore the gases are kept separate. In the case of most internal combustion engines, only the hydrogen gas is directed to the air intake of the engine while the oxygen gas is vented to the atmosphere Hydrogen has a high specific energy, high flame propagation speed and wide range of flammability and as such offers rich potential to promote combustion efficiency and reduce pollutant emissions in diesel fuel and other types of hydrocarbon-based fuels.

Hydrogen is mixed with the air that is used for combustion. The fundamental combustion parameter that compactly characterizes and quantifies the effects of hydrogen addition is the laminar flame speed, which embodies information about the exothermicity, reactivity and diffusivity of the resulting mixture.

To-date, experiments have been conducted for the hydrocarbon fuels methylcyclohexane, toluene, decalin, propane and kerosene. For each fuel, flame speed data were measured under various conditions. Results show a surprising increase in laminar flame speed with added hydrogen. In some cases the results were almost linear. The exact nature of the hydrogen-enhanced burning is seen to depend on the fuel volatility. Under some conditions, hydrogen addition was observed to increase the hydrocarbon burning rate by more than a factor of two. The flame speed increase for many fuels extends to normal and elevated pressures.

With this increase in flame speed, combustion efficiency and particulate matter emissions can also be reduced.

The system can be powered by the vehicles alternator, a stand alone battery, waste heat or solar energy. The system utilizes an engine sensor or an onboard diagnostic (OBD) interface in communication with the vehicle's OBD terminal or other electronic controller, to regulate power to the system and monitor the RPM levels of the engine and the on-demand hydrogen supplemental system to supply hydrogen gas at the engine at specific RPM levels as determined by the vehicle's OBD terminal. Therefore, hydrogen production for the engine is controlled when at idle and at other operating conditions. As the hydrogen gas is produced it is immediately consumed by the engine. No hydrogen is stored on, in or around the vehicle.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

The present invention as will be described in greater detail below provides an apparatus, method and system, particularly, for example, a hydrogen supplemental system used to increase the fuel efficiency and reduce carbon emissions for internal combustion engines. The present invention provides various embodiments as described below. However it should be noted that the present invention is not limited to the embodiments described herein, but could extend to other embodiments as would be known or as would become known to those skilled in the art.

Figure 1:
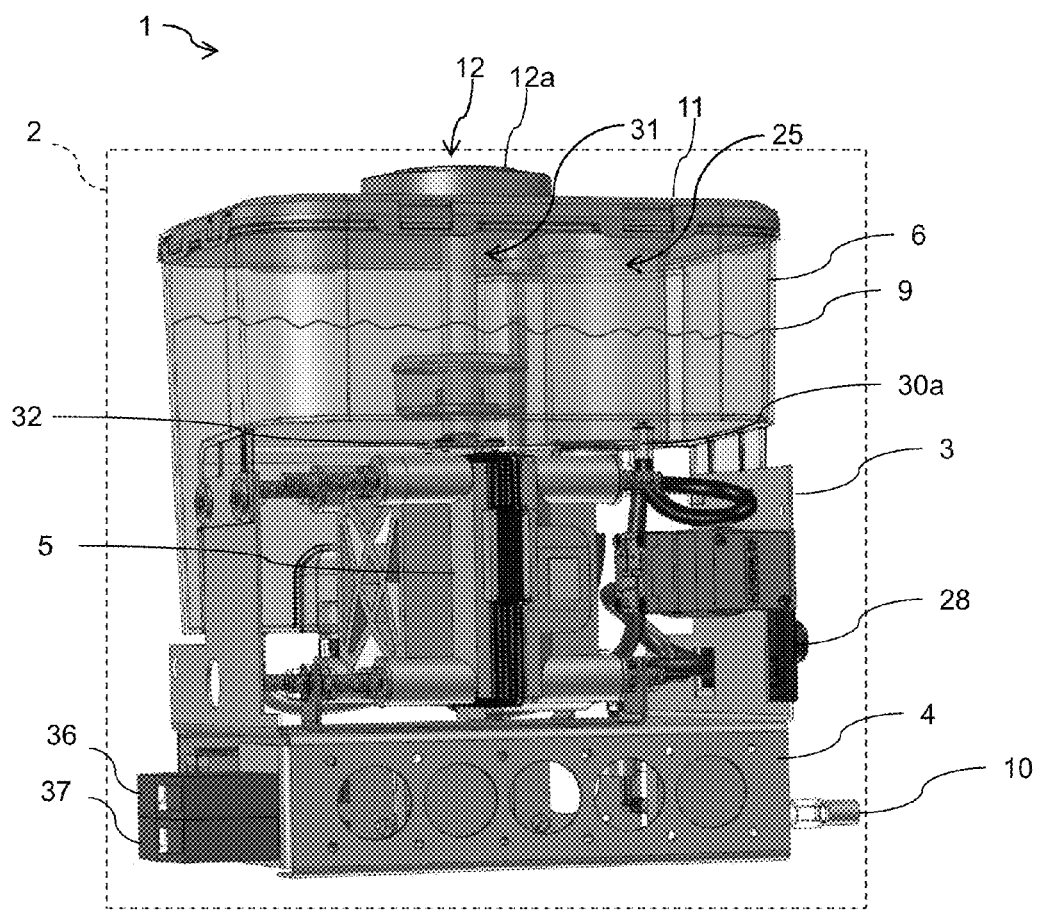
FIG. 1 is a detailed drawing of a front view of a portable hydrogen supplemental system showing a water tank and other components of an interior housing design according to the present invention.

Various components of a portable hydrogen supplemental system 1 are discussed below with reference to FIGS. 1 through 5. The present invention as shown in FIG. 1 provides the portable hydrogen supplemental system 1 which includes a housing unit 2 as outlined via the dashed line shown, that can be secured in the trunk or other flat surface of a vehicle by mounting brackets and fastening units. Inside the housing unit 2 are an electrolyzer 5 and a nonelectrolyte water tank 6 positioned above the electrolyzer 5. The nonelectrolyte water tank 6 is configured to receive nonelectrolyte water 9 therein from an external water source (not shown) via an external water supply connector 10, for supplying the nonelectrolyte water 9 to the electrolyzer 5. The nonelectrolyte water tank 6 is arranged above the electrolyzer 5, in such a manner as to supply the nonelectrolyte water 9 to the electrolyzer 5 by gravity. The nonelectrolyte water tank 6 is supported in the housing unit 2 above the electrolyzer 5 by support 3. The housing unit 2 further includes a separate sub-housing assembly 4 for housing electrical components of the portable hydrogen supplemental system 1. The housing unit 2 is designed to be readily removable from the vehicle.

Figure 2:
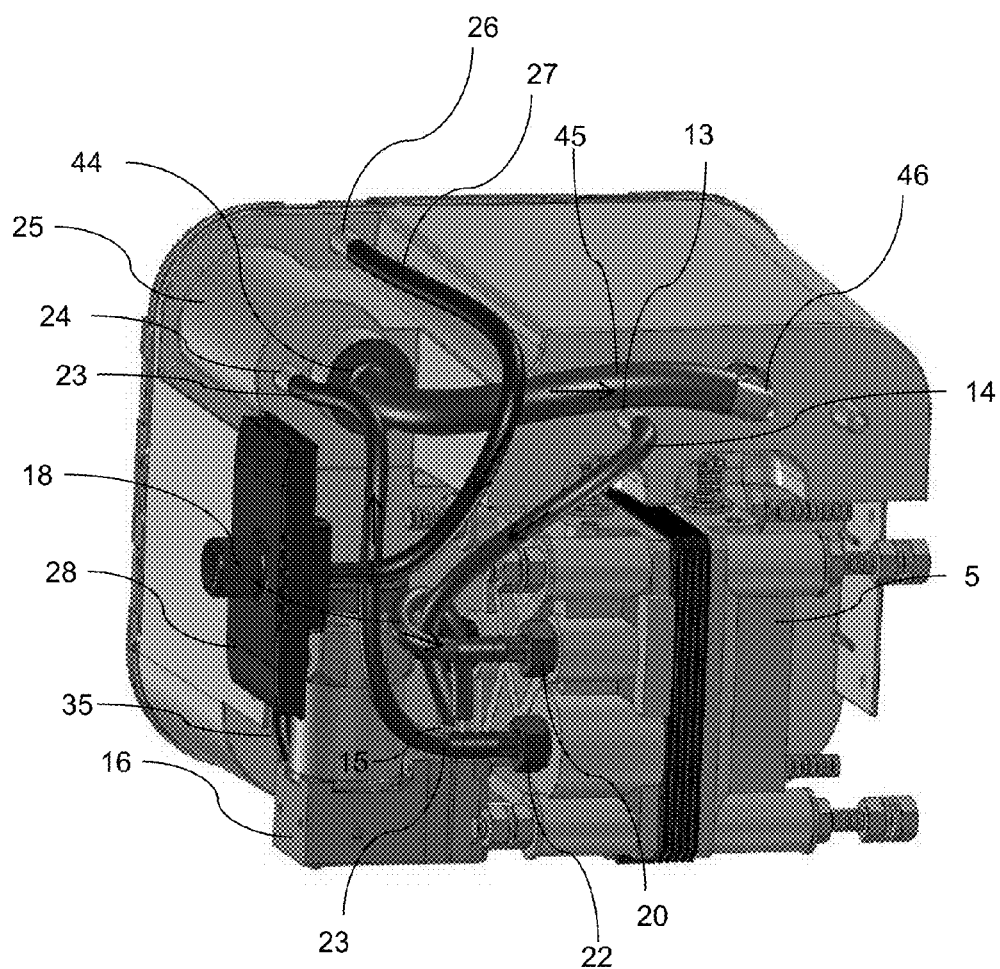
FIG. 2 is a detailed drawing of a bottom side view of the portable hydrogen supplemental system according to the present invention.
Figure 3:
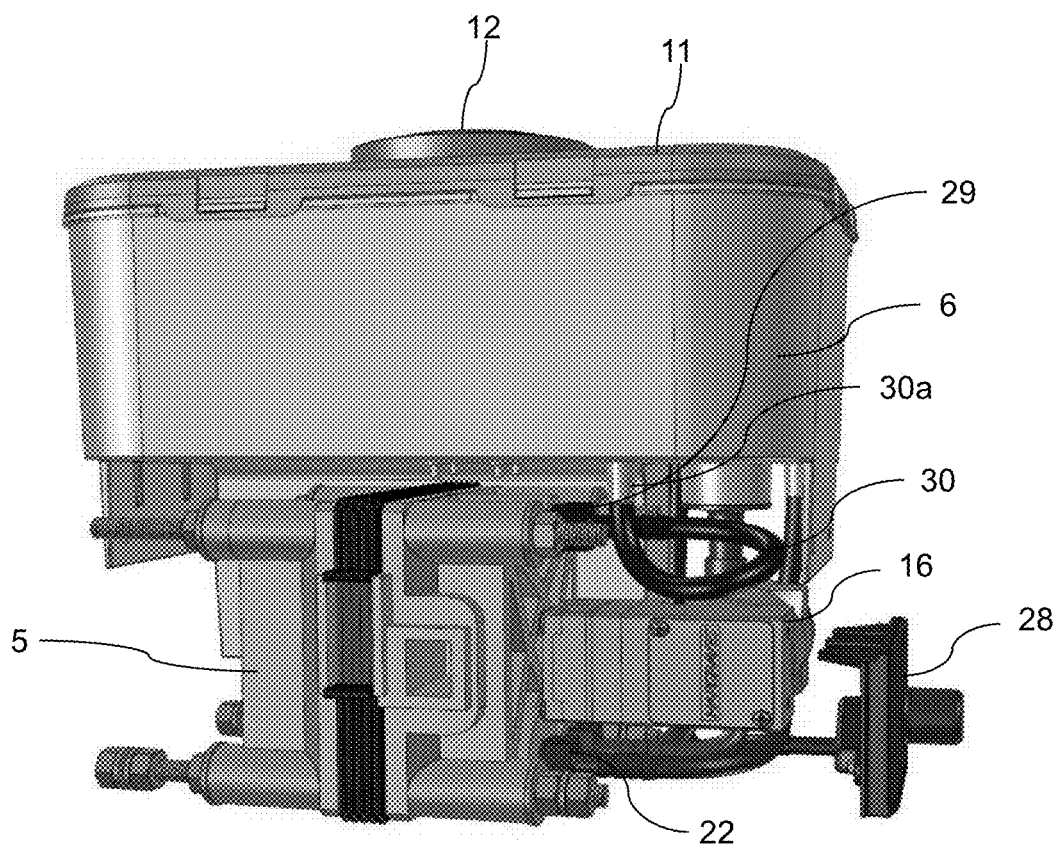
FIG. 3 is a detailed drawing of a rear side view of the portable hydrogen supplemental system according to the present invention.

The nonelectrolyte water tank 6 includes a cover covering a top surface of the nonelectrolyte water tank 6, the cover including a fill spout 12 and spout cover 13 at a top portion thereof for receiving nonelectrolyte water 9 in the nonelectrolyte water tank 6 and filling the nonelectrolyte water tank 6, and a water supply fitting 13 (as shown in FIG. 2) positioned on a rear side of the nonelectrolyte water tank 6 connected to a tube or other supply means 14 that is in turn connected to a water inlet fitting 15 on a pump device 16 for pumping the nonelectrolyte water 9 into the electrolyzer 5. It should be noted that the pump device 16 is provided to maintain a predetermined water pressure of the nonelectrolyte water 9 being supplied to the electrolyzer 5. However, if the water pressure is not an issue, the pump device 16 is an optional element. Nonelectrolyte water 9 is then supplied to the electrolyzer 5 by a tube or other supply 18 connected to the electrolyzer 5 via a connector means 20. The electrolyzer 5 decomposes nonelectrolyte water 9 into hydrogen gas $H_2$ and oxygen gas $O_2$ when received from the nonelectrolyte water tank 6. The electrolyzer 5 also includes a hydrogen gas outlet fitting 22 (as depicted in FIG. 2) connected via tubes or additional supply means 23 and a fitting 24, to a hydrogen gas collector 25 formed at a rear side of the nonelectrolyte water tank 6. Details of the hydrogen gas collector 25 will be discussed below with reference to FIGS. 7 and 8A-8D. Hydrogen gas collected within the hydrogen gas collector 25 is disbursed to the internal combustion engine (i.e., a diesel engine) via a hydrogen outlet fitting 26 and a supply means or other tubing 27, to a hydrogen outlet 28 disposed at a perimeter of the portable hydrogen supplemental system 1. For example, as shown in FIG. 1, according to one embodiment, the hydrogen outlet 28 may be formed below the pump device 16. Oxygen gas and water mixture generated from the electrolyzer 5 is sent to the nonelectrolyte water tank 6 via an oxygen outlet fitting 29 of the electrolyzer 5 and a supply means or other tubing 30 to a tank fitting 30a as shown in FIG. 3.

Referring back to FIG. 1, the nonelectrolyte water tank 6 further includes a float assembly 31 configured to perform a floating operation indicative of a level of the nonelectrolyte water 9 within the nonelectrolyte water tank 6. Details of the operation of the float assembly 31 will be discussed below with reference to FIGS. 6A and 6B. A water level sensor 32 is also provided at a bottom surface of the nonelectrolyte water tank 6, and is configured to magnetically communicate with the float assembly 31, to determine the level of the nonelectrolyte water 9. A temperature sensor may also be provided. The temperature sensor may be mounted within the nonelectrolyte water tank 6 or any suitable location within the housing 2 and be configured to sense a temperature of the nonelectrolyte water 9. A heater may further be provided along a surface of the electrolyzer 5, mounted to a sub-housing assembly or any other suitable location within the housing 2, and configured to heat the nonelectrolyte water 9 when it is detected via the temperature sensor that the nonelectrolyte water 9 has dropped below a predetermined temperature (e.g., 32 degrees). The nonelectrolyte water tank 6 may also include a tank vent port (not shown) for releasing oxygen gas within the nonelectrolyte water tank 6 via a tube or other venting means (e.g. in the fill spout cover 12a, for example.

Figure 4:
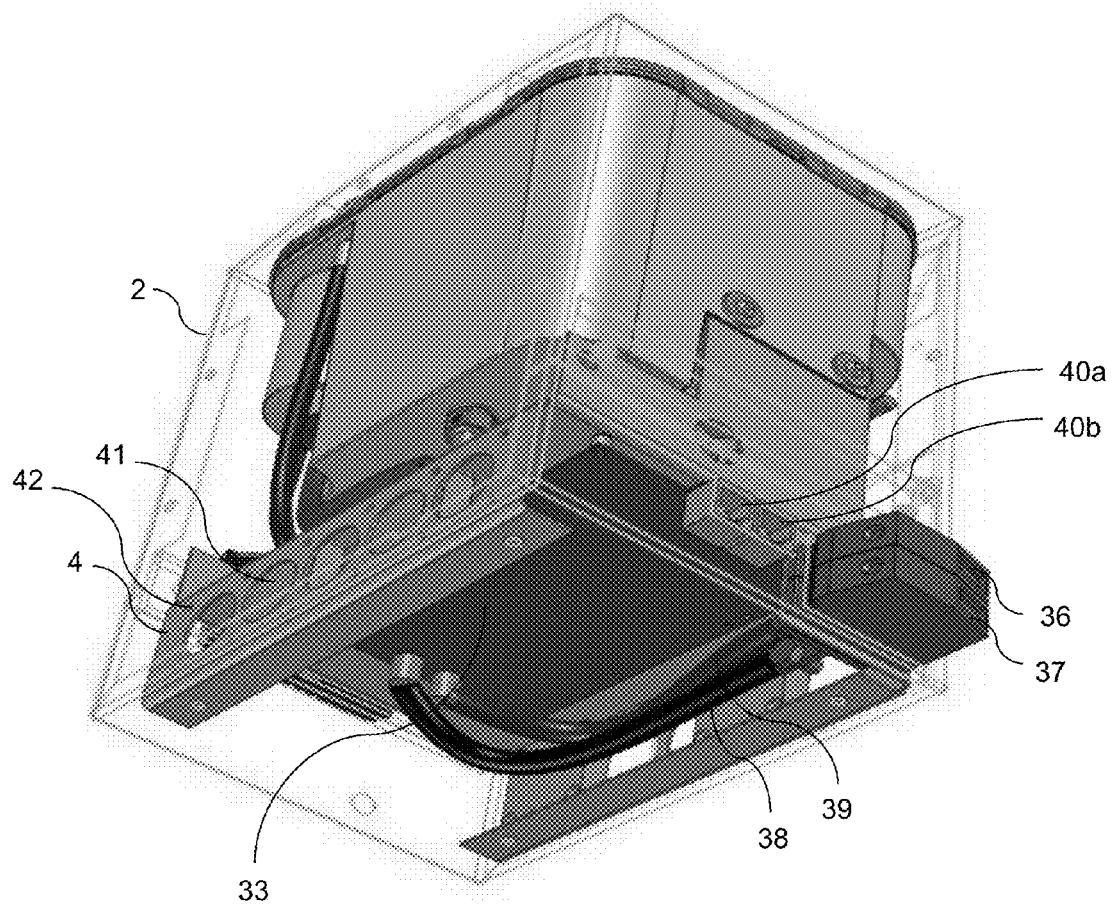
FIG. 4 is a diagram illustrating an embodiment of a sub-housing assembly, housing the control circuit and other electrical components of the portable hydrogen supplemental system, according to the present invention.

In FIG. 4, a main power board 33 is disposed beneath the electrolyzer 5 in the separate sub-housing assembly 4, for example, of the system 1 and configured to supply power to the system 1 using power received via power terminals 36 and 37 connected to the main power board 33 via negative and positive electrical wiring 38 and 39. Additional connectors 40a and 40b are provided for connecting other electrical components of the system 1 thereto (e.g., an on-board diagnostic (OBD) interface). Further, power terminals 36 and 37 are connected to a vehicle battery for supplying power to the system 1. The sub-housing assembly 4 includes through-holes 41 for dissipating heat and cooling components of the main power board 33. An optional heat sink may also be provided on the main power board 33 for dissipating heat and cooling components of the main power board 33. Optional support holes 42 are also provided and configured to receive fastening units (e.g., screws) therein for fastening the sub-housing assembly 4 to the housing unit 2 (i.e., the main housing unit).

Referring back to FIG. 1, the electrolyzer 5 is operated in reverse of a fuel cell (which is commonly known to produce electricity) to produce hydrogen and oxygen gases. Thus, the electrolyzer 5 essentially operates to decompose nonelectrolyte water 9 into hydrogen gas and oxygen gas and is hereinafter referred to as an electrolyzer 5. Nonelectrolyte water 9 fills the electrolyzer 5 from the nonelectrolyte water tank 6 and when a voltage, having positive and negative terminals, is placed across the electrolyzer 5 supplied from the main power board 33, hydrogen and oxygen gases are produced, at different outlets of the electrolyzer 5.

Referring to FIG. 3, during operation of the electrolyzer 5, an oxygen gas and water mixture is generated in the electrolyzer 5 and released from the oxygen gas outlet fitting 29, through the supply means 30 and into the nonelectrolyte water tank 6 by way of tank fitting 30a. Further, hydrogen gas is generated in the electrolyzer 5 and supplied to the hydrogen gas collector 25. A small amount of nonelectrolyte water 9 will exit from the hydrogen gas outlet fitting 22 as the hydrogen gas is produced. The hydrogen gas collector 25 is configured to collect the hydrogen gas and the nonelectrolyte water 9 outputted from the electrolyzer 5. Since the oxygen gas and water mixture is released through the supply means 30 into the nonelectrolyte water tank 6, any nonelectrolyte water 9 of the oxygen gas and water mixture is returned back to the nonelectrolyte water tank 6. Further, any nonelectrolyte water 9 exiting from the hydrogen gas outlet fitting 22 with the hydrogen gas collected in the hydrogen gas collector 25 is returned to the nonelectrolyte water tank 6 via a water return port 44 of the tank 6, for returning the nonelectrolyte water 9 by a tube or other supply means 45 and a water tank fitting 46, to the nonelectrolyte water tank 6 for water preservation. The nonelectrolyte water 9 that comes out of the hydrogen outlet fitting 22 and the oxygen outlet fitting 29 during hydrogen and oxygen production is therefore maintained in the nonelectrolyte water tank 6. The hydrogen gas collector as described in the Application entitled "Hydrogen Supplemental System for On-Demand Hydrogen Generation for Internal Combustion Engines", by Donald Owens may be implemented within the present system and is therefore incorporated herein by reference in its entirety.

Based on the configuration of the system 1, the hydrogen gas and the oxygen gas generated in the electrolyzer 5 travel in different directions and are therefore kept separate from each other.

According to the invention the electrolyzer 5 can, for example, be a proton exchange membrane or polymer electrolyte membrane (PEM) electrolyzer. A PEM electrolyzer includes a semipermeable membrane generally made from ionomers and designed to conduct protons while being impermeable to gases such as oxygen or hydrogen. This is their essential function when incorporated into a membrane electrode assembly (MEA) of a proton exchange membrane electrolyzer or of a proton exchange membrane electrolyzer: separation of reactants and transport of protons.

As known, an electrolyzer is a device that generates hydrogen and oxygen from water through the application of electricity and includes a series of plates through which water flows while low voltage direct current is applied. Electrolyzers split the water into hydrogen and oxygen gases by the passage of electricity, normally by breaking down compounds into elements or simpler products.

Figure 5:
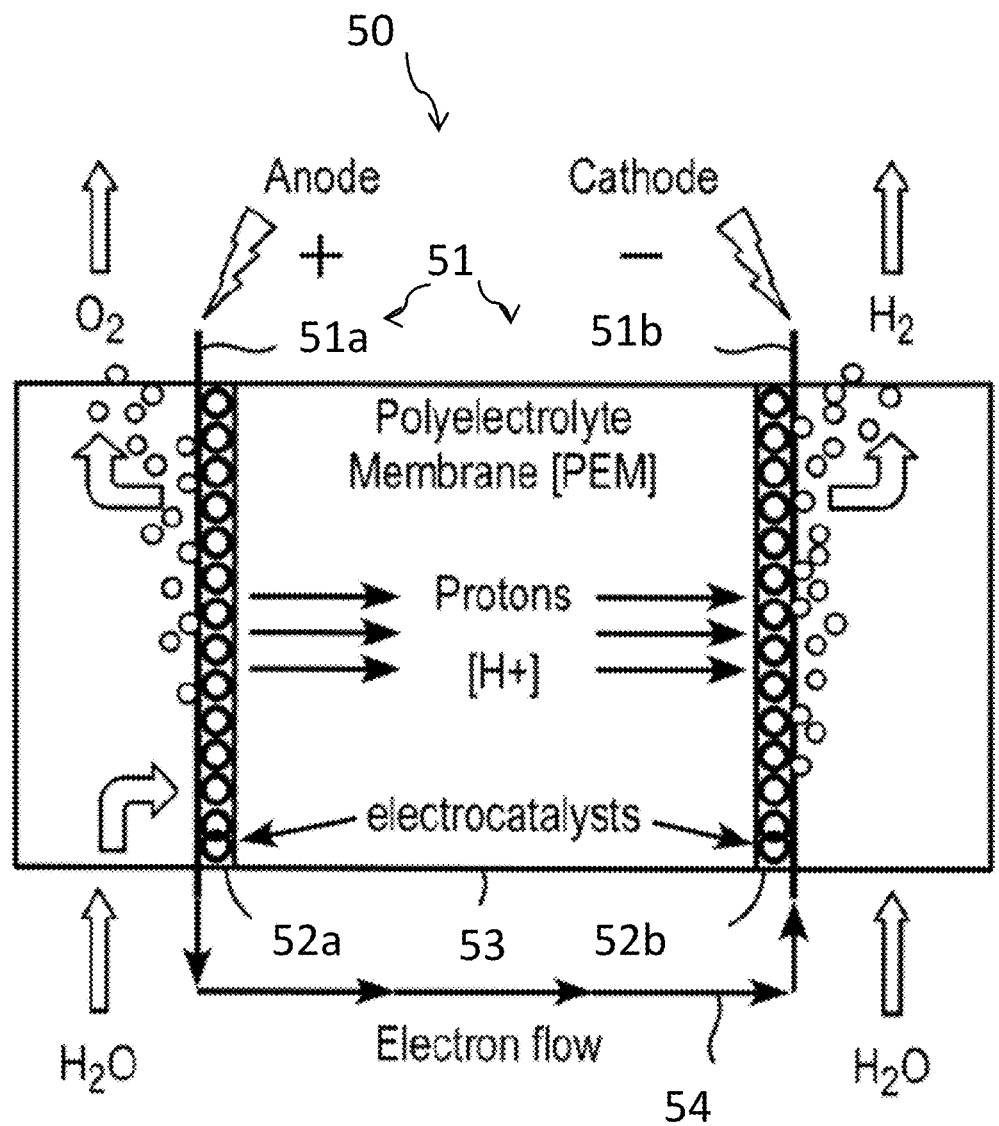
FIG. 5 is a diagram illustrating the operation and details of a PEM electrolyzer according to the present invention.

A PEM electrolyzer 50 is shown in FIG. 5. The PEM electrolyzer 50 includes a plurality of layers which are non-liquid layers including at least two external layers and an internal layer, including external electrodes 51 disposed opposite to each other one of which is the anode 51*a* and the other of which is the cathode 51*b*, electrocatalysts 52*a* and 52*b* disposed respectively on the anode 51*a* and the cathode 51*b*, and a membrane 53 disposed between the electrocatalysts 52*a* and 52*b*. The PEM electrolyzer 50 further includes an external circuit 54 which applies electrical power to the anode 51*a* and the cathode 51*b* in a manner such that electrical power in the form of electrons flow from the anode 51*a*, along the external circuit 54, to the cathode 51*b* and protons are caused to flow through the membrane 53 from the anode 51*a* to the cathode 51*b*.

The efficiency of a PEM electrolyzer 50 is a function primarily of its membrane and electro-catalyst performance. The membrane 53 includes a solid fluoropolymer which has been chemically altered in part to contain sulphonic acid groups, $SO_3H$, which easily release their hydrogen as positively-charged atoms or protons $H^+$: $SO_3H \rightarrow SO_3^- + H^+$ These ionic or charged forms allow water to penetrate into the membrane structure but not the product gases, namely molecular hydrogen $H_2$ and oxygen $O_2$. The resulting hydrated proton, $H_3O^+$, is free to move whereas the sulphonate ion $SO_3^-$ remains fixed to the polymer side-chain. Thus, when an electric field is applied across the membrane 53 the hydrated protons are attracted to the negatively charged electrode, known as the cathode 51*b*. Since a moving charge is identical with electric current, the membrane 53 acts as a conductor of electricity. It is said to be a protonic conductor.

A typical membrane material that is used is called "nafion." Nafion is a perfluorinated polymer that contains small proportions of sulfonic or carboxylic ionic functional groups.

Accordingly, as shown in FIG. 5, nonelectrolyte water 9 enters the electrolyzer 5 and is split at the surface of the membrane 53 to form protons, electrons and gaseous oxygen. The gaseous oxygen leaves the electrolyzer 5 while the protons move through the membrane 53 under the influence of the applied electric field and electrons move through the external circuit 54. The protons and electrons combine at the opposite surface, namely the negatively charged electrode, known as the cathode 53*b*, to form pure gaseous hydrogen.

Figure 6:
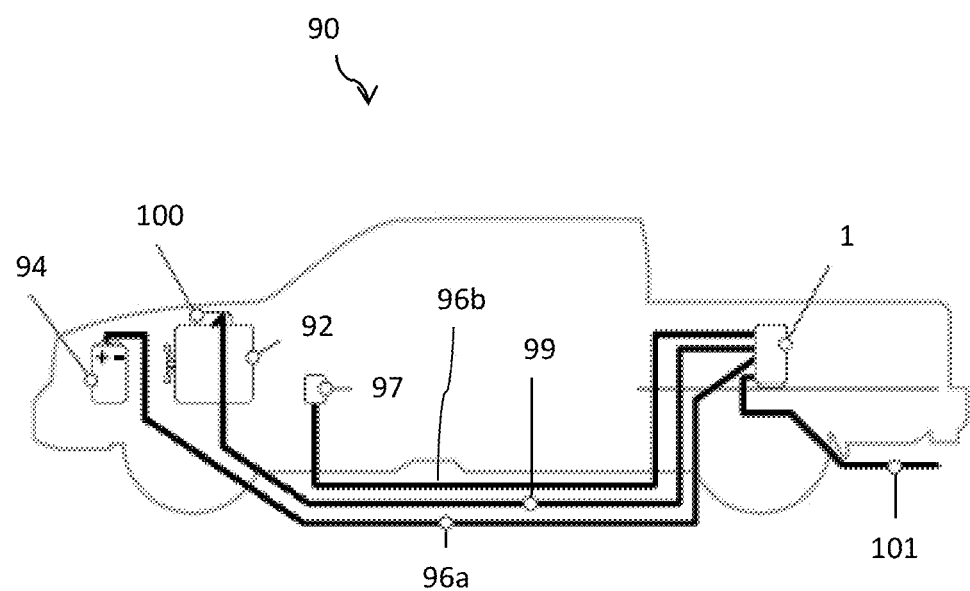
FIG. 6 is a schematic showing a portable hydrogen supplemental system installed in a typical vehicle according to the present invention.
Figure 9:
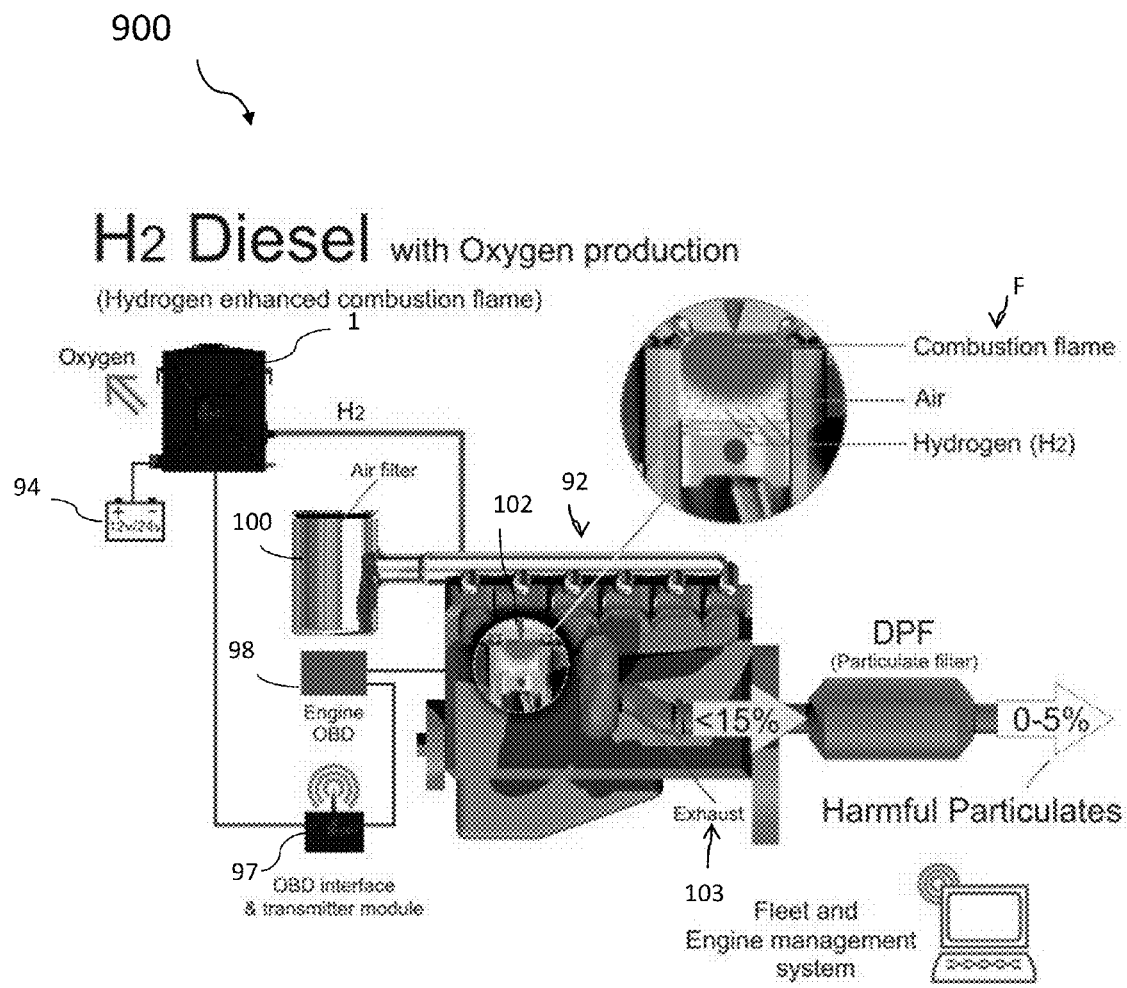
FIG. 9 is a diagram of an embodiment of an internal combustion engine receiving hydrogen from the portable hydrogen supplemental system, depicting enhance combustion due to the presence of hydrogen in the combustion chamber according to the present invention.
Figure 11:
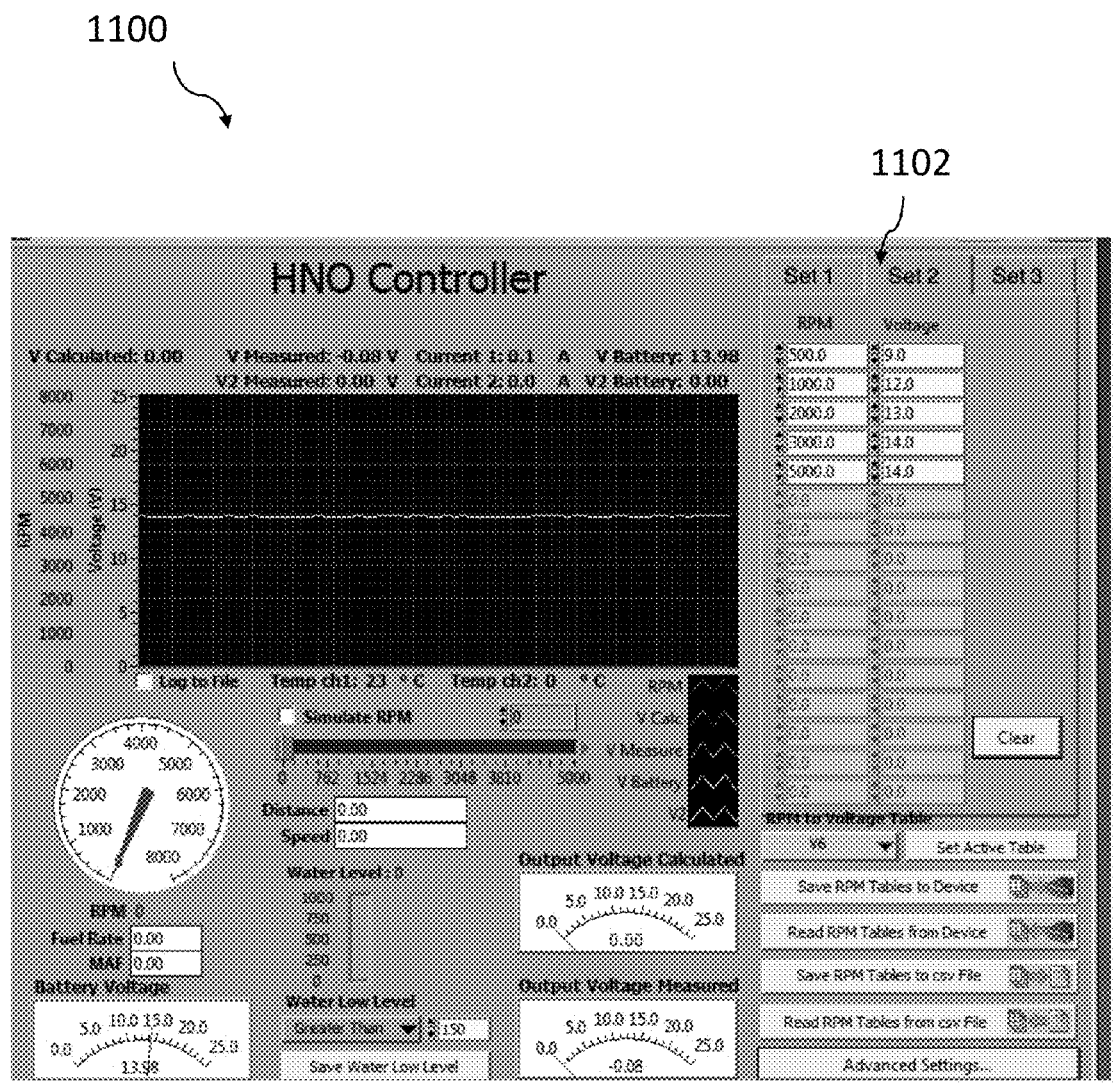
FIG. 11 is a screenshot of a software table providing voltage-to-RPM information in accordance with one or more embodiments of the present invention.

As shown in FIG. 6, a vehicle 90 powered by an engine (e.g., a diesel engine) 92 is equipped with the portable hydrogen supplemental system 1. Power is supplied to the portable hydrogen supplemental system 1 by a vehicle battery 94 connected to electrical wires 96*a*. The electrical circuit to the portable hydrogen supplemental system 1 includes an on-board diagnostic (OBD) interface 97 in communication with the engine 92 via a vehicle OBD terminal 98 (as depicted in FIG. 11), and in communication with the main power board 33 of the system 1 via electrical wires 96*b*. The OBD interface 97 completes the electrical circuit to the portable hydrogen supplemental system 1 when the engine 92 is running (e.g., based on the rotational speed of the engine 92). The vehicle OBD terminal 98 is used to perform self-diagnostic of the vehicle. The OBD terminal 98 enables an operator of the vehicle 90 to access to state of health information for various vehicle sub-systems. Once power is supplied to the portable hydrogen supplemental system 1, hydrogen gas $H_2$ flows thru a hydrogen outlet tube 99 connected to the hydrogen outlet 28 of the housing unit 2 to an air intake 100 of the vehicle's engine 92 and traveling into a combustion chamber 102 as shown in FIG. 9.

In some embodiments, oxygen gas $O_2$ (as depicted in FIG. 5) is returned to the nonelectrolyte water tank 6 via the oxygen outlet fitting 29 of the electrolyzer 5 and a supply means or other tubing 30 to tank fitting 30*a* as shown in FIG. 3. Optionally, the oxygen gas may be released into the atmosphere via the oxygen outlet 101, after returning to the nonelectrolyte water tank 6. The oxygen gas may then be returned back into the atmosphere. According to one or more other embodiments, the two gasses can optionally be combined for diesel engine vehicles or other internal combustion engines without oxygen sensors, if desired.

Figure 7:
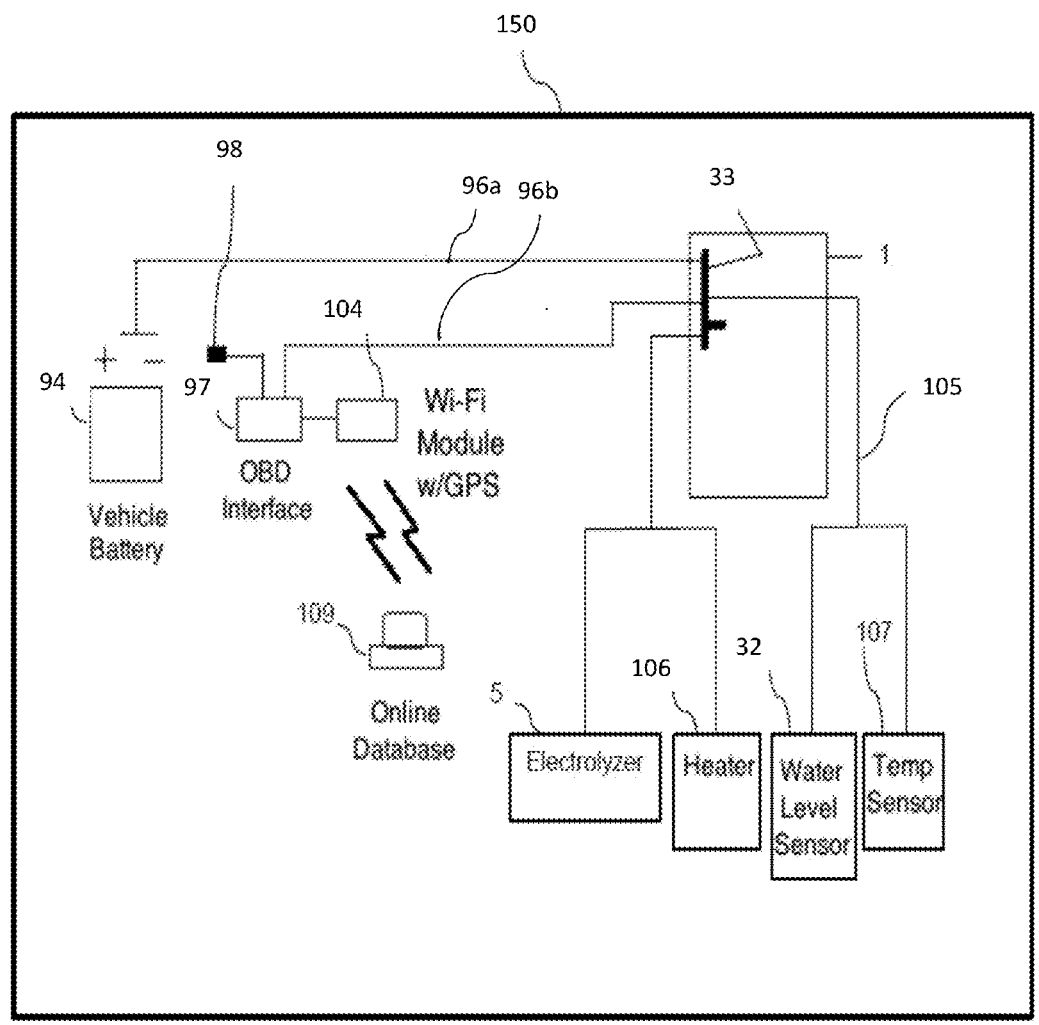
FIG. 7 is a diagram of an embodiment of a control circuit of the present invention.

The electrical circuit can, for example, be provided by a control circuit 150 as illustrated in FIG. 7 for controlling the system 1. The control circuit 150 includes the OBD interface 97 in communication with the vehicle OBD terminal 98 and the main power board 33. The vehicle battery 94 is connected with the power terminals 36 and 37 at the main power board 33. The control circuit 150 further includes a communication module 104 equipped with a global positioning system (GPS). According to one or more embodiments, the communication module 104 is a wireless module for wirelessly transmitting vehicle information via the OBD interface 97. The OBD interface 97 is configured to receive at least one or more data output of the OBD terminal 98, such as rotational speed (RPM) information, speed information, gas usage information, etc. When it is detected that the vehicle 90 is running, the OBD interface 97 sends a signal via the wire 96*b* to the main control board 33, to operate the system 1. For example, when the rotational speed of the engine 92 exceeds a predetermined level, a positive output is sent to the main power board 33, thereby causing the electrolyzer 5 to operate when the engine 92 is running.

According to one or more embodiments of the present invention, the hydrogen gas is generated based on the vehicle speed or a predetermined RPM of the engine or a combination of other outputs from the OBD terminal 98 such that the electrolyzer 5 is activated to generate hydrogen gas.

According to one or more embodiment, the RPMs of the engine 92 have a direct relationship to the efficiency of the engine 92 and to the effectiveness of the hydrogen being introduced to the combustion chamber 102. When the engine 92 is at idle, it is highly inefficient therefore, according to embodiments of the present invention, the amount of hydrogen gas produced within the electrolyzer 5 during this period is increased.

Since, the system 1 monitors the RPMs of the engine 92 via the OBD terminal 98, to determine the amount of voltage to place across the electrolyzer 5 and thus the amount of hydrogen produced, the system 1 is capable of maximizing efficiency depending upon the determined RPMs of the engine 92.

Other components of the system 1 are also connected with the main power board 33 via wires 105. The other components include the electrolyzer 5, the water level sensor 32, a heater 106, and a temperature sensor 107.

According to one or more embodiments of the present invention, the OBD interface 97 is in communication with a database 109 (e.g., a web-based database), via the communication module 104, for receiving vehicle information and system information including status information. The status information may include, for example, water level information from the water level sensor 32 and temperature sensor information from the temperature sensor 107. The database 109 may further store historical data collected over time to be used to control operation or regulate maintenance of the system 1. For example, necessary re-filling of the nonelectrolyte water tank 6 may be determined based on the status information of the water level within the nonelectrolyte water tank 6.

Figure 8:
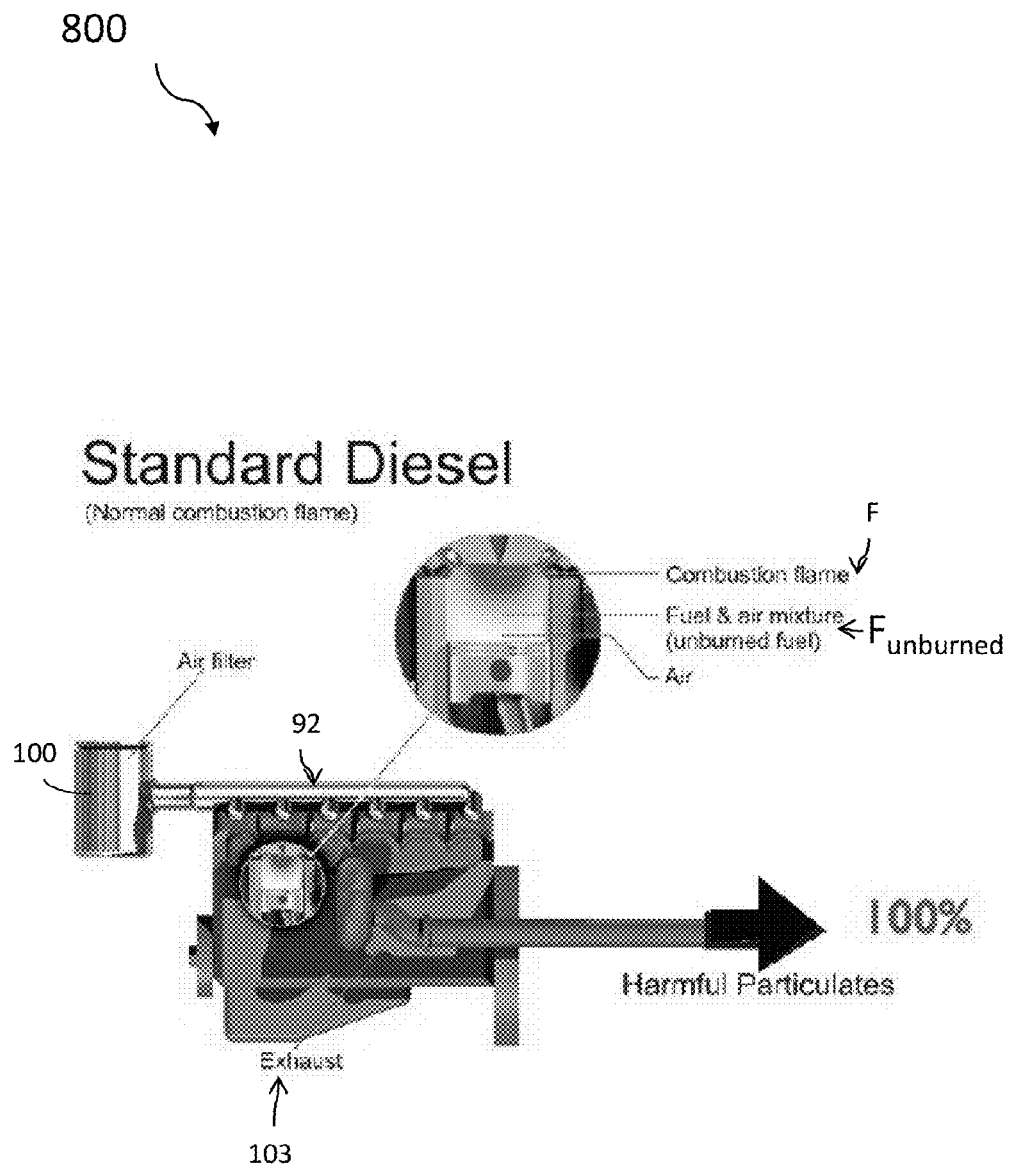
FIG. 8 is a diagram of an internal combustion engine showing the normal combustion characteristics of the engine.

FIG. 8 shows the power cycle of a combustion chamber 102 for a diesel engine 92 whereby the engine 92 uses compression to ignite the fuel. During the power cycle, a combustion flame F ignites the fuel and air mixture that has been injected into the combustion chamber 102. For diesel engines, the combustion flame F is initiated by compression of the air/fuel mixture. In Gasoline engines, the flame F is initiated by a spark plug. As can be seen in the illustration, inherent in all diesel and internal combustion engines, the combustion flame F does not consume 100% of the fuel injected into the cylinder therefore a portion of the fuel is not burned during the power cycle. This is normal for all diesel and internal combustion engines in all stages of operations, but it is particularly problematic when the engine is at idle. Unburned fuel $F_{unburned}$ not consumed by the combustion flame F is the cause of the formation of particulate matter and other emissions and is the direct result of incomplete combustion. As can be seen in this illustration, the exhaust contains 100% of the unburned fuel and particulates.

FIG. 9 shows the power cycle of the combustion chamber 102 for a diesel engine whereby the engine uses compression to ignite the fuel. The hydrogen gas $H_2$ (as labeled) travels into the combustion chamber 102 of the engine 92 via the air intake 100 of the engine and assists with the combustion of fuel therein by increasing the flame speed of the hydrocarbon based fuel, in this case diesel fuel. Since hydrogen $H_2$ increases the laminar flame speed of the diesel fuel, causing it to burn at a faster rate the combustion flame F (as labeled) consumes a larger percentage of the fuel in the combustion chamber 102 and more fuel is burned because of the presence of the hydrogen $H_2$ prior to being exhausted from the combustion chamber 102. The combusted fuel and a smaller amount of the unburned fuel is then release through an exhaust 103. Since the combustion was more complete because of the presence of the $H_2$ gas, the amount of particulate matter (and other unburned hydrocarbons) exiting the combustion chamber 102 and entering the exhaust 103 is greatly reduced. In some cases as much as 50%-90% (or more) of the unburned fuel that would normally reach the exhaust is burned in the combustion chamber instead. Thus greatly lowering the particulate emissions. Other emissions, such as carbon monoxide, and nitrogen oxides are also reduced because of the more complete combustion of the fuel. In this embodiment, an optional diesel particulate filter is employed to reduce the particulate emissions going into the environment even further.

Figure 10:
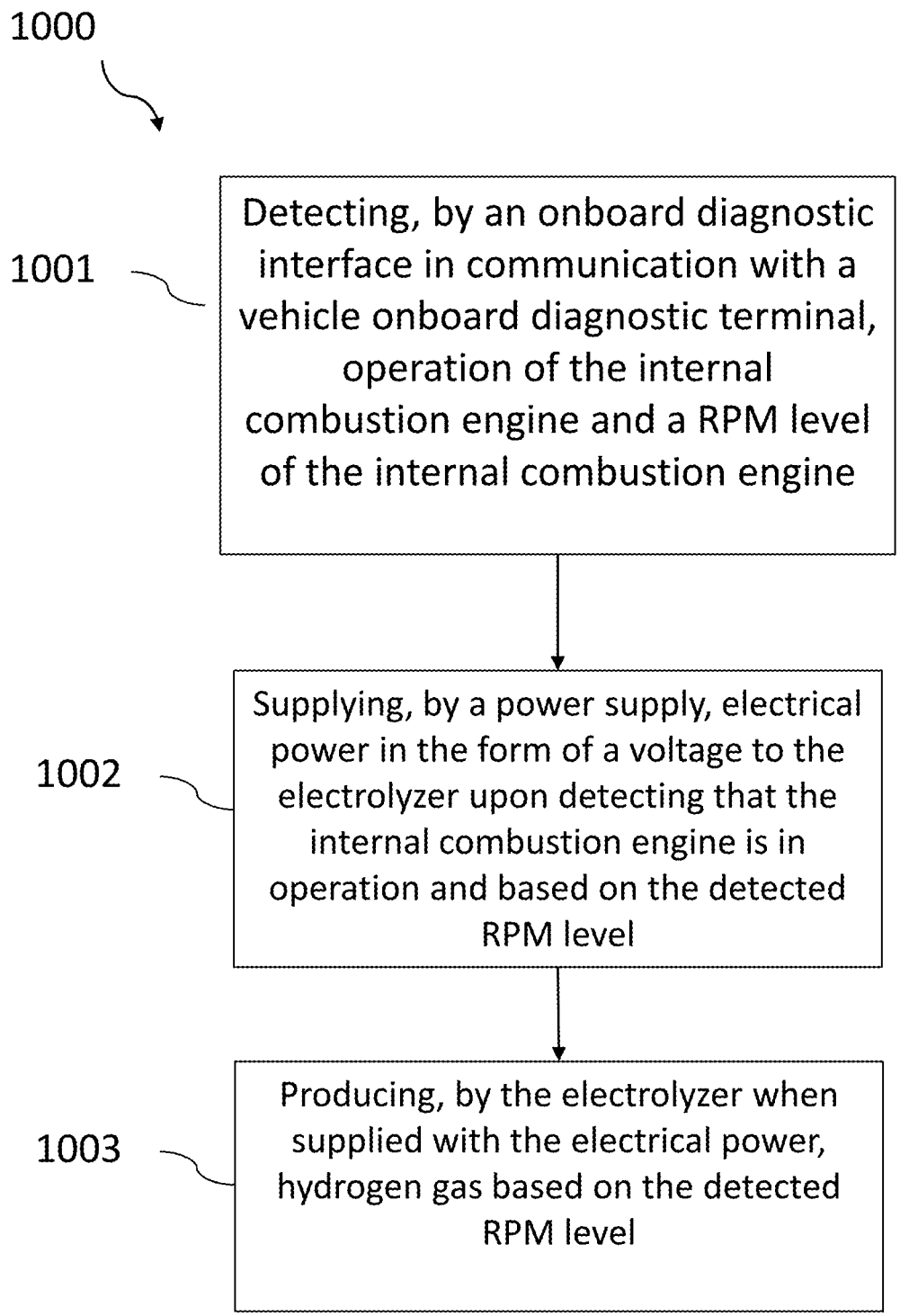
FIG. 10 is a flow diagram illustrating a method for controlling the production of hydrogen within the hydrogen supplemental system based on RPM data in accordance with one or more embodiments of the present invention.

A method of controlling the production of hydrogen within the system will now be described below with reference to FIG. 10.

According to the method 1000 of the present invention, at operation 1001, detecting, by an OBD interface 97 in communication with a vehicle OBD terminal 98, operation of the internal combustion engine 92 and a RPM level of the internal combustion engine 92. From operation 1001, the process continues to operation 1002, by supplying, by a power supply, electrical power in the form of a voltage to the electrolyzer 5 upon detecting that the internal combustion engine is in operation and based on the detected RPM level. From operation 1002, the process continues to operation 1003, by producing, by the electrolyzer 5 when supplied with the electrical power, hydrogen gas based on the detected RPM level.

Further at operation 1003, when at higher RPMs, the voltage across the electrolyzer 5 is adjusted to decrease or increase depending upon engine load and/or engine type, the amount of hydrogen being produced. Alternatively, when at lower RPMs, such as idling conditions, the voltage across the electrolyzer 5 is adjusted to increase the amount of hydrogen being produced or decrease depending upon engine load and/or engine type. Therefore, the variable amount of hydrogen can be accommodated by adjusting the voltage on the electrolyzer 5. Idling can occur between 500 and 1000 RPM depending upon the engine load and/or engine type or class.

FIG. 11 is a screenshot of a software table providing voltage-to-RPM information in accordance with one or more embodiments of the present invention. The voltage-to-RPM information as shown in the software table 1100 is pre-programmable and adjustable as need. As mentioned above, the voltage across the electrolyzer 5 is adjusted to increase the amount of hydrogen being produced or decreased depending upon engine load and/or engine type, when at lower RPMs. Further, when at higher RPMs, the voltage across the electrolyzer 5 is adjusted to decrease or increase depending upon engine load and/or engine type. As shown in the software table 1100, voltage settings may be established in accordance with RPM levels, as desired (see arrow 1102). For example, at 500 RPMs, the voltage level may be set to 9, and for 1000 RPMs, the voltage may be set to 12. The present invention is not limited to any particular ranges or settings for RPM levels and voltage levels, and may vary as necessary. Additional vehicle information is also displayed on the software table 1100 including for example, temperature information, battery information and water level information. However, the present invention is not limited hereto and may vary to include other information not displayed on the software table 1100.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A method of controlling production of hydrogen gas within a hydrogen supplemental system for supplying hydrogen to an internal combustion engine comprising:
   detecting, by an onboard diagnostic interface in communication with a vehicle or engine onboard diagnostic terminal, operation of the internal combustion engine and a RPM level of the internal combustion engine;
   supplying, by a power supply, electrical power in the form of a voltage to an electrolyzer upon detecting that the internal combustion engine is in operation and based on the detected RPM level, wherein the electrolyzer is mounted within a housing unit;
   supplying, from a nonelectrolyte water tank mounted inside the housing unit, nonelectrolyte water to the electrolyzer;
   producing, by the electrolyzer when supplied with the electrical power, hydrogen gas based on the detected RPM level,
      wherein the electrolyzer, when supplied with electrical power produces the hydrogen gas and oxygen gas from the nonelectrolyte water being supplied from the nonelectrolyte water tank via a supply line connected thereto;
      wherein the hydrogen gas is supplied via a hydrogen gas collector directly into an air intake of the internal combustion engine and travels into a combustion chamber of the internal combustion engine to assist with burning of fuel within the combustion chamber; and
   supplying the nonelectrolyte water via a water container disposed within the housing unit above the nonelectrolye water tank,
   wherein the electrolyzer is disposed external of the nonelectrolyte water tank,
   wherein the oxygen gas produced by the electrolyzer travels back through the supply line and is vented to an atmosphere;
   wherein the electrolyzer comprises:
   a plurality of layers, said layers being non-liquid and each layer being in adjacent contact with another one of said layers,
   wherein the plurality of layers includes at least two external layers and an internal layer which is disposed in adjacent contact between the external layers,
   wherein a first external layer is connected to a positive terminal of the power supply and as such applies the positive side of the voltage to a first side of the internal layer, and a second external layer is connected to a negative terminal of the power supply and as such applies the negative side of the voltage to a second side of the internal layer, said first and second sides being on opposite sides of the internal layer, and
   wherein when the voltage is applied across the first external layer, the internal layer and the second external layer, the electrolyzer separates the nonelectrolyte water into the oxygen gas which is output on the first side of the internal layer and the hydrogen gas which is output on the second side of the internal layer.

2. The method according to claim 1, further comprising:
   controlling the electrical power to be supplied by the power supply, wherein the voltage across the electrolyzer is increased when the RPM level is below a certain level depending on at least one of an engine load and/or type and class, and the voltage across the electrolyzer is decreased when the RPM level is above a certain level depending on at least one of the engine load and/or type and class.

3. The method according to claim 2, further comprising:
   transmitting vehicle information, engine information, or both vehicle and engine information via a communication module via the onboard diagnostic interface to the power supply via a communication network.

4. The method according to claim 3, wherein the onboard diagnostic interface is further configured to receive at least one of rotational speed information, speed information, or fuel usage information.

5. The method according to claim 1, wherein the internal combustion engine is a diesel engine.

* * * * *